Patented Apr. 25, 1939

2,155,723

UNITED STATES PATENT OFFICE 2,155,723

STABILIZATION OF TRICHLORETHYLENE

Arthur A. Levine and Oliver W. Cass, Niagara Falls, N. Y., assignors to E. I. du Pont de Nemours & Company, Wilmington, Del., a corporation of Delaware No Drawing. Application March 8, 1937, Serial No. 129,682

4 Claims. (Cl. 23—250)

This application relates to the stabilization of chlorohydrocarbons. More particularly, it relates to the stabilization of the chlorinated hydrocarbon trichlorethylene, $C_2HCl_3$.

Trichlorethylene is widely used commercially as a solvent in various industries. These uses include the degreasing of metals, the dry cleaning of textile fabrics, the extraction of oils, fats and waxes from susbtances of animal, mineral or vegetable origin, as a vehicle for other substances in coating, impregnating, and similar processes, and, in fact, for almost any manufacturing or cleaning operation in which a stable, volatile, non-inflammable solvent is required.

However, unless it is stabilized against chemical decomposition trichlorethylene will decompose, thereby developing acid during storage or use. Moreover, there is a tendency for the trichlorethylene to decompose during solvent recovery operations in which impure solvent is subjected to distillation and condensation in order to free it from dissolved impurities. In order to combat this tendency to decompose during storage use, and recovery operations, it has been usual to dissolve in the trichlorethylene an agent which will stabilize the solvent under the conditions at which these operations are normally carried out.

Although various stabilizing agents have been used in the past to stabilize trichlorethylene, nevertheless the search for superior stabilizers which would inhibit the development of acidity in the solvent over long periods of storage or use, has continued. Investigation has shown that trichlorethylene is not subject to the same type of decomposition as that encountered with other chlorinated hydrocarbons such as, for example, carbon tetrachloride. While carbon tetrachloride is subject to decomposition as a result of hydrolysis, the chlorohydrocarbon splitting off acid as a result of chemical reaction with the water which may be present in greater or less amount in the solvent, trichlorethylene is not subject to hydrolysis to any substantial extent. The decomposition which occurs in trichlorethylene upon exposure to light during storage for prolonged periods of time, or when the solvent is subjected for a substantial period of time to a relatively elevated temperature, has been found to be an oxidation reaction.

As a result of experience with various other stabilizers that have been employed from time to time in the stabilization of trichlorethylene, and as a result of research as to the fundamental causes for the changes in trichlorethylene involving the development of acidity, it has now been determined that certain essential properties are necessary in any stabilizing agent which is of value for the stabilization of trichlorethylene. Among these properties are relative solubility in the trichlorethylene, the stabilizing agent being at least more soluble in the chlorinated hydrocarbon than in water. Obviously if this were not so the water, which invariable finds its way in greater or less amount into trichlorethylene during industrial operations, would extract the stabilizing agent, thereby reducing or entirely removing this agent from the material which it is designed to stabilize against chemical decomposition. Moreover, solutions of the stabilizing agent in trichlorethylene must be odorless in the concentrations used and, upon distilling the product, there must be no residual odor. This is an important requirement as otherwise in commercial dry cleaning operations a more or less objectionable odor would be imparted to the fabrics cleaned. In addition, the solution of stabilizer in solvent should be colorless or, at least, colorless when kept away from the direct rays of the sun. Certain batches of stabilized solvent may turn slightly yellow or brown when exposed to the direct rays of the sun, but this need not be objectionable unless the same development of color occurs when the solvent is kept out of contact with sunlight. As industrial operations with solvents are normally carried out out of direct contact with the rays of the sun this requirement is met when the stabilizer is one which does not yield a colored solution upon exposure to direct light.

It may also be noted that the stabilizer should not form colored metallic salts with the metals commonly employed in the construction of equipment. Some dissolving of these metals in the water or solvent occurs, and if the stabilizer should form colored metallic salts there would result a colored aqueous layer floating upon the denser trichlorethylene. If the metal salt were soluble in trichlorethylene the solvent would be colored. This would be clearly objectionable, and should be avoided by proper selection of the stabilizer.

The principal objects of this invention may be summarized therefore by stating that they involve the stabilization of trichlorethylene by the incorporation therein, in small amounts, of stabilizing agents which will answer the requirements enumerated above. The stabilizers with which this invention is concerned are substantially odorless when incorporated in the solvent and the provision of an odorless stabilized solvent, such as is especially advantageous in commercial dry cleaning operations, is a further and important object of this invention. The ensuing disclosure of a preferred embodiment of our new process of stabilizing and the resulting stabilized solvents will render apparent other objects of this invention.

We have found that certain substituted phenols, particularly p-tert-butyl phenol and p-tert-amyl phenol, are especially satisfactory when employed for stabilizing trichlorethylene. These compounds have the chemical formula respectively, $C_6H_4(OH)C_4H_9$ and $C_6H_4(OH)C_5H_{11}$. When these substituted phenols are incorporated in trichlorethylene in amounts ranging from 0.001 to 0.1% by weight based on the weight of the trichlorethylene, we secure a substantially odorless solvent of superior stability. We have found that the development of acidic products in the trichlorethylene is thereby inhibited to a remarkable degree. While we have specified amounts ranging from 0.001 to 0.1% as utilizable for stabilizing this chlorinated hydrocarbon, we prefer to use amounts ranging from 0.005 to 0.02%. Ordinarily neither substituted phenol need be present in amounts exceeding 0.02% by weight based on the weight of the trichlorethylene, as beneficial stabilizing effects are completely obtained at this concentration or at lower concentrations.

As an indication of the stabilizing effect of p-tert-butyl phenol and p-tert-amyl phenol, various comparative experiments were carried out with solvents stabilized with these stabilizing agents and with unstabilized trichlorethylene and trichlorethylene stabilized by the addition of other stabilizing agents. These tests are summarized in the following table.

In carrying out these experiments, samples of trichlorethylene were stabilized as specified in the table, where a stabilizer was present, and all samples were then stored in direct sunlight for the periods of time indicated. The quantity of acidity developed in the solvent was determined at various intervals during this period of exposure to direct sunlight. For determining the quantity of acid a selected sample of the solvent, 25 cc., was titrated with 0.01 N sodium hydroxide solution. The values given in the table are the number of cc. of this 0.01 N solution required to neutralize the acid present in 25 cc. of the solvent at the end of the storage period indicated.

*Quantity of 0.01 N NaOH required to neutralize acidity after period of storage noted*

| Sample of trichlorethylene tested—stabilized with— | Percent stabilizer | 56 hours | 200 hours | Remarks |
|---|---|---|---|---|
| | | Cc. | Cc. | |
| No stabilizer | | 75 | 110 | Colorless. |
| p-Tert-butyl-phenol | 0.02 | 3.5 | 8.0 | Do. |
| p-Tert-amyl-phenol | 0.02 | 5.0 | 12.0 | Colorless, no residual odor. |
| Thymol | 0.02 | 6.0 | 15.0 | Colorless. |

The various proportions and amounts specified herein are to be construed as illustrative and not restrictive except as required by the prior art or by the appended claims. It is obvious that various changes may be made which would nevertheless still come within the scope of the broad concept of our invention. Accordingly, the invention is to be accorded a range of equivalents which is limited only by the prior art and by the claims which are hereto annexed.

We claim:

1. A composition of matter comprising trichlorethylene and stabilizing amounts of a substituted phenol selected from the group which consists of p-tert-butyl phenol and p-tert-amyl phenol.

2. A composition of matter comprising trichlorethylene and from 0.001 to 0.1% of a substituted phenol selected from the group which consists of p-tert-butyl phenol and p-tert-amyl phenol, said amount being by weight based on the weight of said trichlorethylene.

3. A composition of matter comprising trichlorethylene and from 0.001 to 0.1% of p-tert-butyl phenol, said amount being by weight based on the weight of said trichlorethylene.

4. A composition of matter comprising trichlorethylene and from 0.001 to 0.1% of p-tert-amyl phenol, said amount being by weight based on the weight of said trichlorethylene.

ARTHUR A. LEVINE.
OLIVER W. CASS.